(12) United States Patent  
Liu et al.

(10) Patent No.: US 10,754,354 B2  
(45) Date of Patent: Aug. 25, 2020

(54) HOVER CONTROL

(71) Applicant: SZ DJI TECHNOLOGY CO., LTD., Shenzhen (CN)

(72) Inventors: Ang Liu, Shenzhen (CN); Yongjian Zhao, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 51 days.

(21) Appl. No.: 16/136,607

(22) Filed: Sep. 20, 2018

(65) Prior Publication Data

US 2019/0018428 A1    Jan. 17, 2019

Related U.S. Application Data

(63) Continuation of application No. PCT/CN2016/077473, filed on Mar. 28, 2016.

(51) Int. Cl.
| | |
|---|---|
| *G05D 1/04* | (2006.01) |
| *G01C 11/06* | (2006.01) |
| *G05D 1/10* | (2006.01) |
| *B64C 39/02* | (2006.01) |
| *B64D 47/08* | (2006.01) |
| *G01C 11/04* | (2006.01) |
| *G05D 1/00* | (2006.01) |
| *G05D 1/06* | (2006.01) |

(52) U.S. Cl.
CPC ........... *G05D 1/042* (2013.01); *B64C 39/024* (2013.01); *B64D 47/08* (2013.01); *G01C 11/04* (2013.01); *G01C 11/06* (2013.01); *G05D 1/0038* (2013.01); *G05D 1/101* (2013.01); *B64C 2201/14* (2013.01); *G05D 1/0607* (2013.01)

(58) Field of Classification Search
CPC ........ G05D 1/042; G05D 1/038; G05D 1/101; B64C 39/024; B64C 2201/14; B64D 47/08; G01C 11/04; G01C 11/06
USPC .............................................................. 701/4
See application file for complete search history.

(56) References Cited

U.S. PATENT DOCUMENTS

| | | | | |
|---|---|---|---|---|
| 9,607,388 | B2* | 3/2017 | Lin | ...................... H04N 13/221 |
| 9,947,230 | B2* | 4/2018 | Hu | ........................... G09B 9/08 |
| 9,969,337 | B2* | 5/2018 | Liao | ........................... G06T 7/73 |
| 10,429,839 | B2* | 10/2019 | Liu | ....................... B64C 39/024 |
| 2006/0074532 | A1 | 4/2006 | Hong et al. | |
| 2016/0068114 | A1* | 3/2016 | Liao | ........................... G06T 7/73 |
| | | | | 348/148 |

(Continued)

FOREIGN PATENT DOCUMENTS

| | | |
|---|---|---|
| CN | 102298070 A | 12/2011 |
| CN | 103979104 A | 8/2014 |

(Continued)

OTHER PUBLICATIONS

The World Intellectual Property Organization (WIPO) International Search Report for PCT/CN2016/077473 dated Jan. 3, 2017 6 pages.

*Primary Examiner* — Krishnan Ramesh
(74) *Attorney, Agent, or Firm* — Anova Law Group, PLLC

(57) ABSTRACT

A hover control method includes obtaining a flight velocity of an unmanned aerial vehicle (UAV), obtaining an image frame as a keyframe in response to that the flight velocity satisfies a preset condition, and controlling hovering of the UAV using the keyframe as a reference object.

18 Claims, 5 Drawing Sheets

(56) References Cited

U.S. PATENT DOCUMENTS

| | | | | |
|---|---|---|---|---|
| 2016/0070265 A1* | 3/2016 | Liu | ....................... | G01C 21/00 |
| | | | | 701/3 |
| 2016/0086336 A1* | 3/2016 | Lin | ..................... | H04N 13/221 |
| | | | | 348/50 |
| 2017/0039859 A1* | 2/2017 | Hu | ......................... | G09B 9/08 |

FOREIGN PATENT DOCUMENTS

| CN | 104865968 A | 8/2015 |
|---|---|---|
| CN | 104932523 A | 9/2015 |
| CN | 105045276 A | 11/2015 |
| CN | 105404310 A | 3/2016 |
| WO | 2010071505 A1 | 6/2010 |
| WO | 2016059785 A1 | 4/2016 |

* cited by examiner

HOVER CONTROL

CROSS-REFERENCE TO RELATED APPLICATION

This application is a continuation application of International Application No. PCT/CN2016/077473, filed on Mar. 28, 2016, the entire contents of which are incorporated herein by reference.

TECHNICAL FIELD

The present disclosure relates to unmanned aerial vehicle (UAV) technology and, more particularly, to a UAV, and a hover control method and system thereof.

BACKGROUND

Currently, unmanned aerial vehicles (UAVs) are used more and more widely. With the development in the UAV industry, more and more UAVs accomplish complex missions, such as hovering, side-flying, backward-flying, and the like. Hovering is a vital part of the UAV's flight mission, and hence the hover control is particularly important.

In conventional technologies, the hover control of the UAV is based on the feedback of the flight velocity of the UAV. Generally, as long as an integral of the control velocity over time is zero, the UAV is considered to be currently hovering.

However, for example, when the UAV has a migration velocity of 5 meters per second in a preset direction, the UAV is controlled to have a migration velocity of 5 meters per second in an opposite direction, such that the overall integration velocity is controlled to zero. As such, the conventional control methods easily cause a dramatic shake of the UAV.

SUMMARY

In accordance with the disclosure, there is provided a hover control method including obtaining a flight velocity of an unmanned aerial vehicle (UAV), obtaining an image frame as a keyframe in response to that the flight velocity satisfies a preset condition, and controlling hovering of the UAV using the keyframe as a reference object.

Also in accordance with the disclosure, there is provided a hover control system including one or more processors. The one or more processors are configured to obtain a flight velocity of an unmanned aerial vehicle (UAV), obtain an image frame as a keyframe in response to that the flight velocity satisfies a preset condition, and control hovering of the UAV using the keyframe as a reference object.

DETAILED DESCRIPTION OF THE EMBODIMENTS

Exemplary embodiments will be described with reference to the accompanying drawings. In the situation where the technical solutions described in the embodiments are not conflicting, they can be combined.

Figure 1:
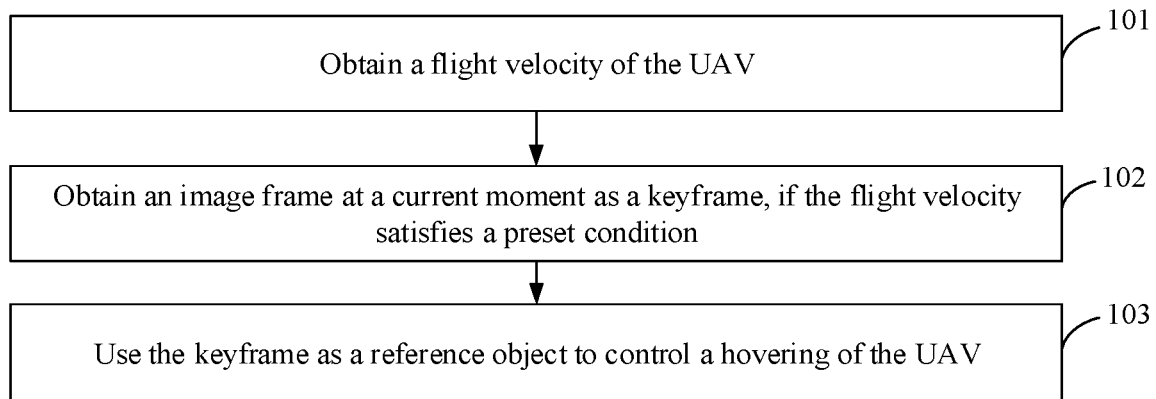
FIG. 1 is a schematic flow chart of a hover control method of an unmanned aerial vehicle (UAV) according to an embodiment of the disclosure.

FIG. 1 is a schematic flow chart of an exemplary hover control method of an unmanned aerial vehicle (UAV) consistent with the disclosure. The processes in FIG. 1 can be executed by a processor having a control function, a control chip, or the like.

As shown in FIG. 1, at 101, a flight velocity of the UAV is obtained.

In some embodiments, the flight velocity of the UAV can be obtained from a velocity sensor provided on the UAV. The velocity sensor can include one or more of an Inertial Measurement Unit (IMU), an accelerometer, and a distance measurement sensor.

In some other embodiments, a Global Positioning System (GPS) can be used to obtain displacement information and time information of the UAV's flight, so as to obtain the flight velocity of the UAV. In some other embodiments, a combination of the two manners described above can be used to obtain the flight velocity of the UAV.

At 102, if the flight velocity satisfies a preset condition, an image frame at a current moment is obtained as a keyframe.

The keyframe refers to the image frame obtained when the flight velocity satisfies the preset condition.

In some embodiments, the preset condition can be that the UAV is relatively stationary and the value of the flight velocity of the UAV is very small. For example, if the value of the flight velocity is smaller than a preset threshold, the image frame can be obtained as the keyframe.

In some embodiments, the preset condition can be that the flight velocity is zero, and the image frame obtained at the current moment can be used as the keyframe if this condition is satisfied.

In some other embodiments, the preset condition can also be that a direction of the velocity, also referred to as a "velocity direction," of the UAV oscillates in a preset direction. That is, if an integrated velocity of the UAV is less than a preset threshold, the image frame obtained at the current moment can be used as the keyframe.

Furthermore, in order to control right and left shaking or up and down shaking of the UAV, a process at 103 can be implemented.

At 103, the keyframe is used as a reference object to control a hovering of the UAV.

When the flight velocity satisfies the preset condition, the keyframe can be used as the reference object and can be compared with a prestored image frame. When feature information of the keyframe matches feature information of the prestored image frame, the UAV can be controlled to hover.

The comparison of the keyframe with the prestored image frame can be implemented in various manners. For example, whether there is a relative displacement of pixels in a same coordinate system between the feature information of the keyframe and the feature information of the prestored image frame is determined. When there is no relative displacement, the feature information of the keyframe and the feature information of the prestored image frame are determined to be matched.

The absence of the relative displacement of the pixels refers to that the feature information of the keyframe completely coincides with the feature information of the preset image frame in the same coordinate system. For example, the feature information of the prestored image frame can include a stationary object having a square structure with a size of 4×4 pixels or another size of another number of pixels. The flight velocity and flight direction of the UAV can be adjusted to control the stationary object having the square structure with the size of 4×4 pixels in the keyframe to completely coincide with that in a predicted image frame in the same coordinate system.

In some embodiments, the feature information can include a stationary feature object, such as a lighthouse, a building, or the like. In some embodiments, the feature information can also include a moving feature object, such as an airplane, a car, or the like. When the feature information includes the moving feature object, a movement velocity of the moving feature object can be obtained. The flight velocity of the UAV can be adjusted according to the movement velocity of the moving feature object and velocity information of the UAV. In some other embodiments, the feature information can include feature pixels. It is not intended to limit the selection of the feature information.

According to the embodiment of the disclosure, the hovering of the UAV can be controlled by selecting the keyframe as the reference object. A reverse compensate for a migration velocity of the UAV is not needed, thereby avoiding a drastic shake of the UAV.

Figure 2:
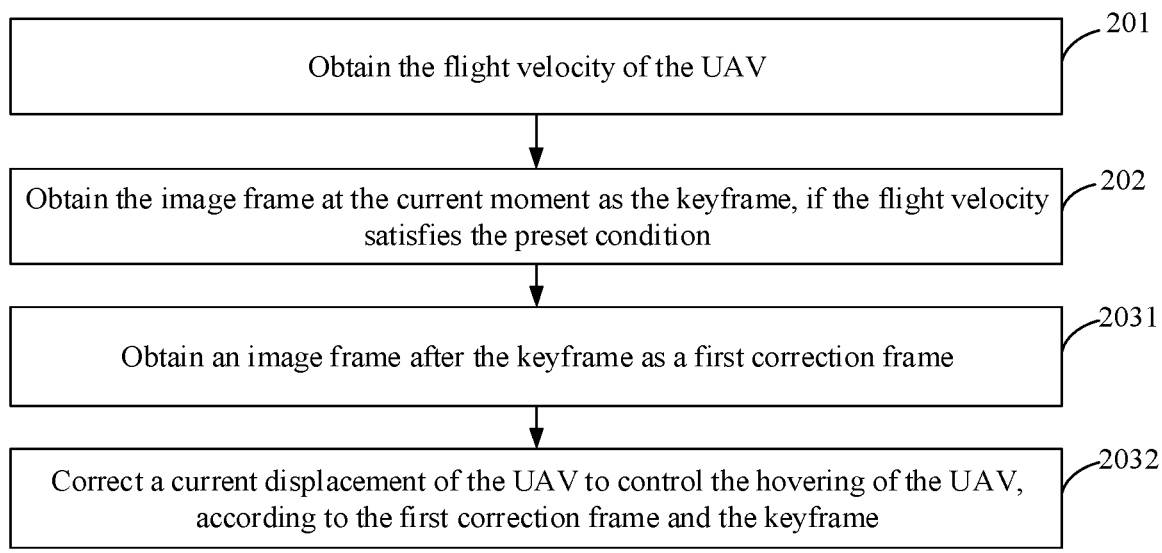
FIG. 2 is a schematic flow chart of another hover control method of a UAV according to an embodiment of the disclosure.

FIG. 2 is a schematic flow chart of another exemplary hover control method of a UAV consistent with the disclosure.

As shown in FIG. 2, at 201, the flight velocity of the UAV is obtained.

At 202, if the flight velocity satisfies the preset condition, the image frame at the current moment is obtained as the keyframe.

The process at 201 is the same as the process at 101 and the process at 202 is the same as the process at 102. The detailed description thereof is omitted here.

In some embodiments, the process at 103 in FIG. 1 can be implemented by the following processes.

At 2031, an image frame after the keyframe is obtained as a first correction frame.

The first correction frame can be the image frame obtained after the keyframe. A time interval between obtaining the first correction frame and obtaining the keyframe can be set according to a frame rate at which a photographing component provided on the UAV captures the image.

At 2032, a current displacement of the UAV is corrected to control the hovering of the UAV, according to the first correction frame and the keyframe.

The current displacement refers to a displacement of the UAV between a shooting time of a currently acquired image frame and a shooting time of the keyframe.

In some embodiments, at 2032, a flight displacement vector of the UAV between times corresponding to the first correction frame and the keyframe can be obtained, according to the first correction frame and the keyframe. This flight displacement vector can be used as the current displacement.

The time corresponding to the keyframe refers to the shooting time of the keyframe. The shooting time of the keyframe is also referred to as the first shooting time. The time corresponding to the first correction frame refers to the shooting time of the first correction frame and is also referred to as the second shooting time. Movement change information of the UAV between the first shooting time and the second shooting time can be obtained, according to the first correction frame and the keyframe. This movement change information can be used as the flight displacement vector. The flight displacement vector can include one or more of a rotational motion parameter, a translational motion parameter, or the like, of the UAV between the first shooting time and the second shooting time.

The flight displacement vector between the keyframe and the correction frame described later refers to the movement change information of the UAV between the shooting time of the keyframe and the shooting time of the correction time. The correction frame herein refers to an image frame that is used to compare with the keyframe. The correction frame can be the first correction frame or a second correction frame. Any image frame that is compared with the keyframe can be used as the correction frame.

In some embodiments, the flight displacement vector can include direction information of a flight displacement of the UAV. The flight displacement refers to an amount of movement of the feature information of the second correction frame when compared with the feature information of the keyframe.

Furthermore, in order to control the UAV to perform spot hovering, the current displacement of the UAV can be controlled according to the flight displacement vector, such that the flight displacement vector can be less than or equal to a preset value. That is, the UAV is controlled to fly back to a position before the change of movement.

According to the embodiment of the disclosure, the image frame obtained after the keyframe can be used as the first correction frame. That is, the flight displacement vector of the UAV can be corrected at any time, such that the spot hovering of the UAV can be realized.

In some embodiments, the process at 2032 can be implemented as follows. A stationary feature in the keyframe can be selected and the current displacement of the UAV can be corrected based on the stationary feature. That is, the flight displacement vector of the UAV between the times corresponding to the first correction frame and the keyframe can be obtained, according to the stationary feature in the first correction frame and the keyframe.

In some embodiments, a stationary feature point can be selected from the keyframe, and the selected feature point can be transformed and projected to the coordinate system of the first correction frame. Furthermore, the stationary feature point can be matched with the stationary feature in the first correction frame.

A displacement amount and a displacement direction of pixels of the feature point in the first correction frame can be obtained according to the matching result. The flight displacement vector can be obtained, according to the displacement direction of pixels, the displacement amount of pixels, and a preset mapping relationship between the displacement amount of pixels and a flight distance. The current displacement of the UAV can be corrected based on the flight displacement vector.

Figure 3:
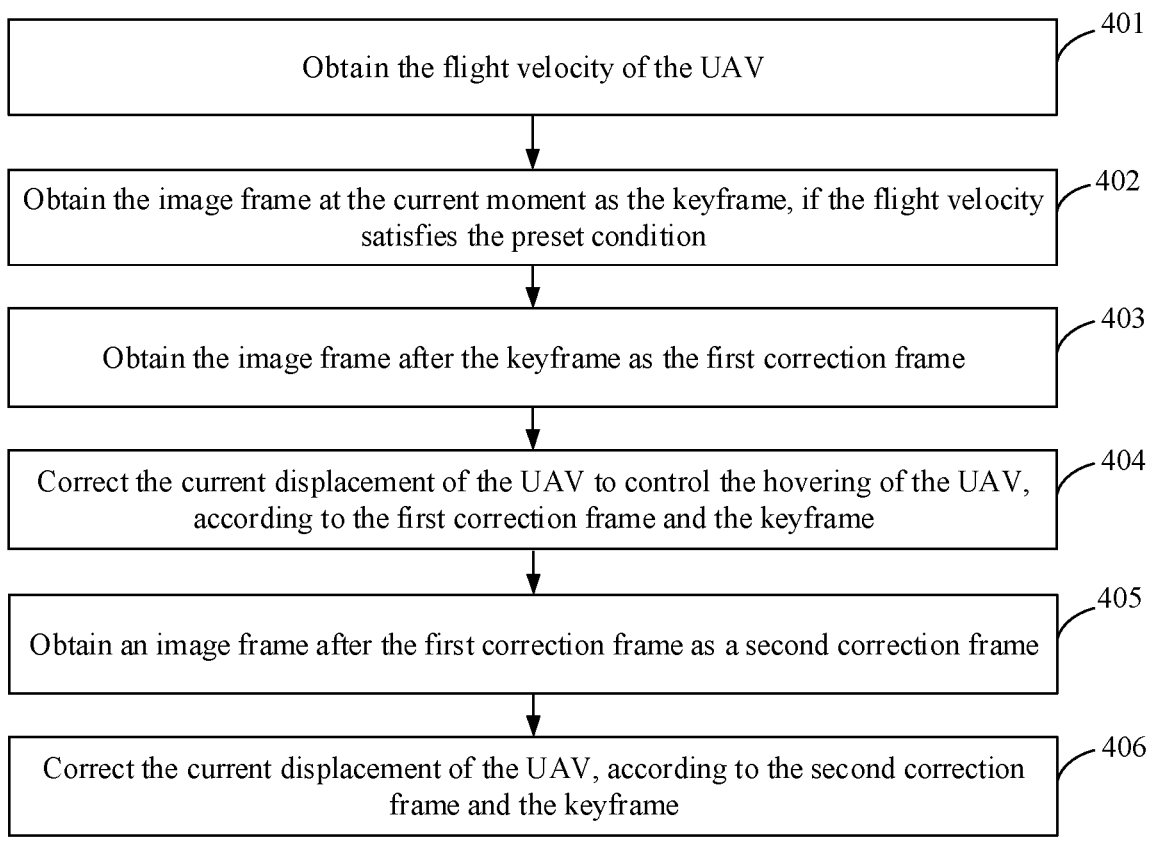
FIG. 3 is a schematic flow chart of another hover control method of a UAV according to an embodiment of the disclosure.

FIG. 3 is a schematic flow chart of another exemplary hover control method of a UAV consistent with the disclosure.

As shown in FIG. 3, at 401, the flight velocity of the UAV is obtained.

At 402, if the flight velocity satisfies the preset condition, the image frame at the current moment is obtained as the keyframe.

At 403, the image frame after the keyframe is obtained as the first correction frame.

At 404, the current displacement of the UAV is corrected to control the hovering of the UAV, according to the first correction frame and the keyframe.

The implementation of the above processes is the same as the implementation of the corresponding processes in FIGS. 1 to 3. The detailed description thereof is omitted here.

At 405, an image frame after the first correction frame is obtained as a second correction frame.

At 406, the current displacement of the UAV is further corrected according to the second correction frame and the keyframe.

After the first correction frame is obtained, the second correction frame can be obtained to further correct the current displacement of the UAV.

In some embodiments, after the second correction frame is obtained, an image after the second correction frame can also be obtained and used as a third correction frame. The current displacement of the UAV can be further corrected according to the third correction frame and the keyframe. That is, calibration processes at 405 and 406 can be repeatedly performed to continuously modify the current displacement of the UAV, such that the spot hovering can be achieved.

In some embodiments, the current displacement of the UAV can be corrected based on the first correction frame and the second correction frame. That is, the flight displacement vector can be obtained based on a subsequently acquired image frame and a previously acquired image frame, such that the current displacement of the UAV can be obtained. However, an error of the flight displacement vector obtained between the subsequently acquired image frame and the previously acquired image frame can be accumulated as the UAV hovers for a long time. As such, the UAV can drift relative to a preset spot, when the UAV performs the spot hovering.

For example, when there are a first error of the flight displacement vector obtained between the second correction frame and the first correction frame and a second error of the flight displacement vector obtained between the third correction frame and the second correction frame, a superposition of the first error and the second error can cause an inaccurate current displacement of the UAV after being corrected.

According to the embodiment of the disclosure, no matter it is the first correction frame or the second correction frame, the current displacement of the UAV can be corrected by using the keyframe as the reference object, such that the drift of the UAV caused by the superposition of the errors can be avoided.

Figure 4:
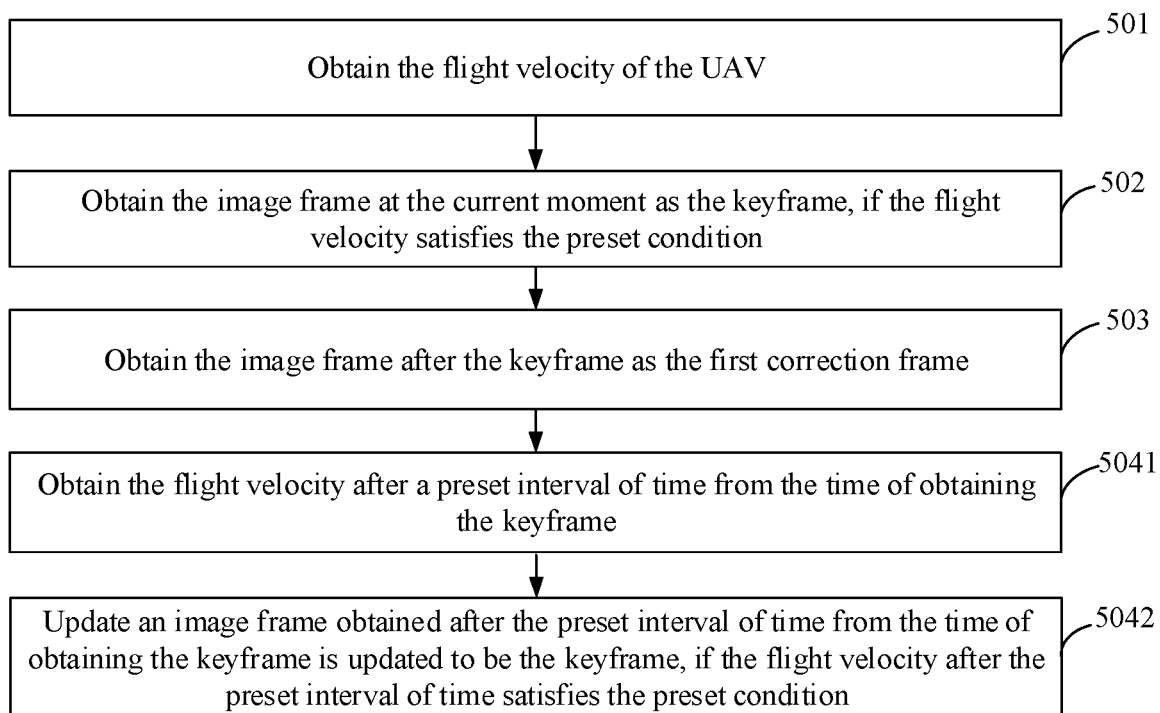
FIG. 4 is a schematic flow chart of another hover control method of a UAV according to an embodiment of the disclosure.

FIG. 4 is a schematic flow chart of another exemplary hover control method of a UAV consistent with the disclosure. When illumination changes greatly at the current time and the hovering of the UAV is still controlled by using the original keyframe as the reference object, the hover control may not be stable or accurate. In order to eliminate the influence of the illumination, the keyframe can be updated at a certain interval of time.

As shown in FIG. 4, at 501, the flight velocity of the UAV is obtained.

At 502, if the flight velocity satisfies the preset condition, the image frame at the current moment is obtained as the keyframe. This flight velocity is also referred to as a "first flight velocity" and this image frame is also referred to as a "first image frame."

At 503, the image frame after the keyframe is obtained as the first correction frame.

The implementation of the processes at 501 to 503 is the same as the implementation of the corresponding processes in FIG. 1 or 2. The detailed description thereof is omitted here.

At 5041, the flight velocity after a preset interval of time from the time of obtaining the keyframe is obtained. This flight velocity is also referred to as a "second flight velocity."

At 5042, if the flight velocity after the preset interval of time satisfies a preset condition, an image frame after the preset interval of time from the time of obtaining the keyframe is obtained. This image frame is also referred to as a "second image frame." Further, the keyframe is updated to be the second image frame.

The preset interval of time can be set according to actual needs. For example, if the photographing component has a frame rate of 25 image frames per second, the keyframe can be updated every 10 seconds. A frequency of updating the keyframe may be lower than the frame rate of the photographing component.

The preset condition at 5042 and the preset condition at 502 can be the same condition or different conditions.

In some embodiments, the processes at 5041 and 5042 can be implemented after the process at 406. In some other embodiments, the process at 403 can be implemented after the processes at 5041 and 5042. The processes at 5041 and 5042 can be implemented as long as an initial keyframe is obtained. That is, the processes at 5041 and 5042 can be implemented after a first keyframe is obtained. It is not intended to limit the implementation order of the processes at 5041 and 5042 and other processes.

Because the keyframe can be updated at the preset interval of time and the current displacement of the UAV can be corrected by using the updated keyframe as the reference object to compare with the correction frame, the influence of changes in illumination can be eliminated. For example, assume that there is no positional displacement of the UAV with respect to the preset spot at the current time, but due to the change of the illumination, a difference between gray levels of the currently obtained correction frame and the keyframe can be significant. In this situation, when the flight displacement vector is obtained according to the current keyframe and the correction frame, a dislocation of the feature matching between the frames may be easily caused. As such, the obtained flight displacement vector may be inaccurate, which may further cause the problem that the hover control is not stable and accurate. However, if the keyframe is updated at the preset interval of time, the difference between the gray levels of the images between the keyframe and the correction frame can be eliminated. That is, the influence of changes in illumination can be eliminated, such that the stability of the hover control can be improved.

Figure 5:
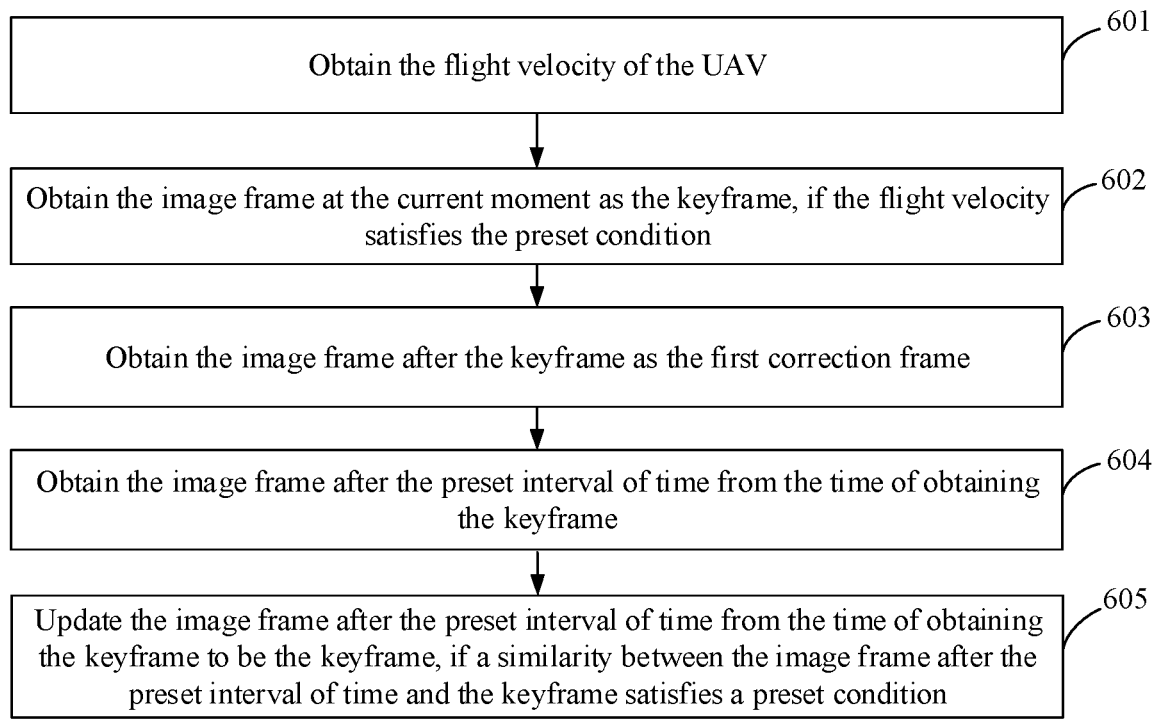
FIG. 5 is a schematic flow chart of another hover control method of a UAV according to an embodiment of the disclosure.

FIG. 5 is a schematic flow chart of another exemplary hover control method of a UAV consistent with the disclosure.

As shown in FIG. 5, at 601, the flight velocity of the UAV is obtained.

At 602, if the flight velocity satisfies the preset condition, the image frame at the current moment is obtained as the keyframe.

At 603, the image frame after the keyframe is obtained as the first correction frame.

The implementation of the processes at 601 to 603 is the same as the implementation of the corresponding processes in any of FIGS. 1 to 5. The detailed description thereof is omitted here.

At 604, the image frame after the preset interval of time from the time of obtaining the keyframe is obtained.

At 605, if a similarity between the image frame after the preset interval of time and the keyframe satisfies a preset condition, the keyframe is updated to be the image frame after the preset interval of time.

In some embodiments, if the similarity between the image frame after the preset interval of time and the keyframe is high, the change of the illumination can be considered to be small, and the keyframe does not need to be updated. In some embodiments, the keyframe can be updated even though the similarity is high.

In order to avoid the influence of the moving object on the similarity between the two image frames, the stationary feature in the image frame after the preset interval of time can be selected, and the similarity between the image frame after the preset interval of time and the keyframe can be determined according to the stationary feature.

When the similarity between the image frame after the preset interval of time and the keyframe is low, the change of the illumination can be considered to be large, and the keyframe can be updated.

In some embodiments, the flight velocity after the preset interval of time can be obtained. When the flight velocity after the preset interval of time satisfies the preset condition, the processes at 604 and 605 can be implemented. In some other embodiments, the image frame after the preset interval of time can be obtained. When the similarity between the image frame after the preset interval of time and the keyframe satisfies a preset condition, the processes at 5041 and 5042 can be implemented.

According to the embodiment of the disclosure, the keyframe can be updated at the preset interval of time, which can ensure that the difference of the gray levels between the keyframe and the correction frame can be eliminated. That is, the influence of changes in illumination can be eliminated, such that the stability of the hover control can be improved.

Figure 6:
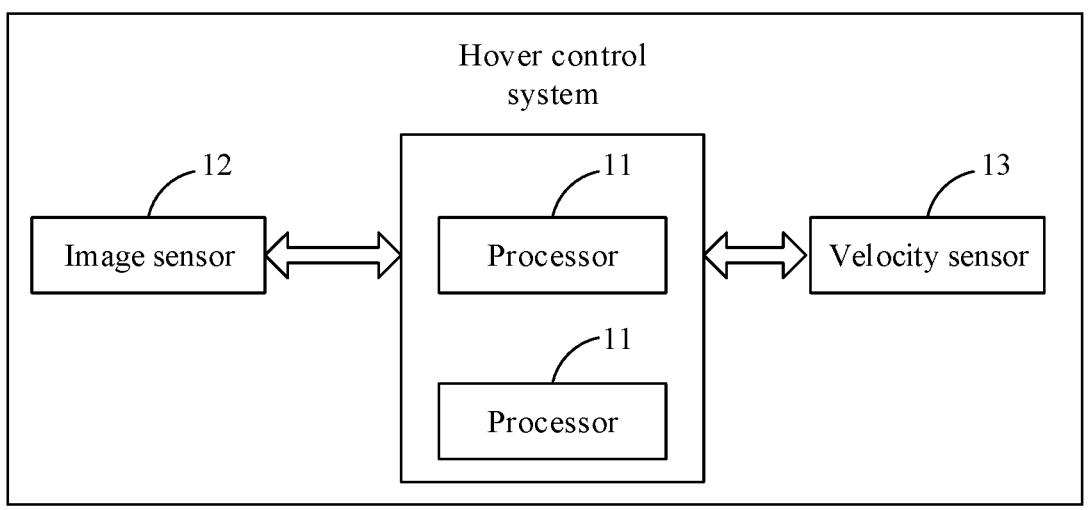
FIG. 6 is a schematic structural diagram of a UAV hover control system according to an embodiment of the disclosure.

FIG. 6 is a schematic structural diagram of an exemplary UAV hover control system consistent with the disclosure. As shown in FIG. 6, the control system includes one or more processors 11 that can work individually or cooperatively. The one or more processors 11 are configured to obtain a flight velocity of the UAV, when the flight velocity satisfies a preset condition, use an image frame obtained at a current moment as a keyframe, and use the keyframe as a reference object to control a hovering of the UAV.

In some embodiments, the one or more processors 11 can be configured to implement a method for controlling hovering of a UAV consistent with the disclosure, such as one of the UAV hover control methods described above.

In some embodiments, the one or more processors 11 can obtain the flight velocity of the UAV from another processor. In some other embodiments, the one or more processors 11 can obtain the flight velocity of the UAV from a velocity sensor carried by the UAV. In some embodiments, as shown in FIG. 6, the UAV hover control system includes the one or more processors 11 and a velocity sensor 13 communicatively coupled to the one or more processors 11. The velocity sensor 13 is configured to detect the flight velocity of the UAV.

In some embodiments, the velocity sensor 13 can include one or more of an Inertial Measurement Unit (IMU), an accelerometer, and a distance measurement sensor.

In some other embodiments, the one or more processors can obtain displacement information and time information of the UAV's flight from a Global Positioning System (GPS), so as to obtain the flight velocity of the UAV.

The keyframe refers to the image frame obtained when the flight velocity satisfies the preset condition.

In some embodiments, the preset condition can be that the UAV is relatively stationary and the value of the flight velocity of the UAV is very small. For example, if the value of the flight velocity is smaller than a preset threshold, the one or more processors 11 can obtain the image frame as the keyframe.

In some embodiments, the preset condition can be that the flight velocity is zero, and the one or more processors 11 can obtain the image frame at the current moment as the keyframe if this condition is satisfied.

In some other embodiments, the preset condition can also be that a velocity direction of the UAV oscillates in a preset direction. That is, if an integrated velocity of the UAV is less than a preset threshold, the one or more processors 11 can obtain the image frame at the current moment as the keyframe.

When the flight velocity satisfies the preset condition, the one or more processors 11 can use the keyframe as the reference object to compare with a prestored image frame. When feature information of the keyframe matches feature information of the prestored image frame, the one or more processors 11 can control the UAV to hover. For example, when there is no relative displacement of pixels in a same coordinate system between the feature information of the keyframe and the feature information of the prestored image frame, the feature information of the keyframe and the feature information of the prestored image frame are determined to be matched.

The absence of the relative displacement of the pixels refers to that the feature information of the keyframe completely coincides with the feature information of the preset image frame in the same coordinate system. For example, the feature information of the prestored image frame can include a stationary object having a square structure with a size of 4×4 pixels or another size of another number of pixels. The one or more processors 11 can adjust flight velocity and flight direction of the UAV to control the stationary object having the square structure with the size of 4×4 pixels in the keyframe to completely coincide with that in a predicted image frame in the same coordinate system.

In some embodiments, the feature information can include a stationary feature object, such as a lighthouse, a building, or the like. In some embodiments, the feature information can also include a moving feature object, such as an airplane, a car, or the like. When the feature information includes the moving feature object, a movement velocity of the moving feature object can be obtained. The flight velocity of the UAV can be adjusted according to the movement velocity of the moving feature object and velocity information of the UAV. In some other embodiments, the feature information can also include feature pixels. It is not intended to limit the selection of the feature information.

According to the embodiment of the disclosure, the one or more processors 11 can select the keyframe as the reference object to control the hovering of the UAV. A reverse compensate for a migration velocity of the UAV is not needed, thereby avoiding a drastic shake of the UAV.

In some embodiments, as shown in FIG. 6, the hovering control system of the UAV includes the one or more processors 11 and an image sensor 12 communicatively coupled to the one or more processors 11. The image sensor 12 is configured to capture image frames.

The image sensor 12 can include one or more cameras. The image sensor 12 can include one camera (e.g., a monocular camera) or two cameras (e.g., a binocular camera). It can be appreciated by those skilled in the art that the image sensor 12 can also include a plurality of cameras. It is not intended to limit the number of cameras.

It is not intended to limit a spectral band of the camera. For example, an infrared camera can be used to facilitate nighttime operations. As another example, a visible-light camera can also be used. The spectrum range of the camera can be changed according to actual needs.

In some embodiments, the hovering control system of the UAV includes the one or more processors 11 and the velocity sensor 13 communicatively coupled to the one or more processors 11.

In some other embodiment, the hovering control system of the UAV includes the one or more processors 11, the velocity sensor 13, and the image sensor 12.

In some embodiments, the one or more processors 11 can be configured to obtain an image frame after the keyframe as a first correction frame, and correct a current displacement of the UAV to control the hovering of the UAV, according to the first correction frame and the keyframe.

The current displacement refers to a displacement of the UAV between a shooting time of a currently acquired image frame and a shooting time of the keyframe.

In some embodiments, the one or more processors 11 can be configured to obtain a flight displacement vector of the UAV between times corresponding to the first correction frame and the keyframe, according to the first correction frame and the keyframe. This flight displacement vector can be used as the current displacement.

The time corresponding to the keyframe refers to the shooting time of the keyframe. The shooting time of the keyframe is also referred to as the first shooting time. The time corresponding to the first correction frame refers to the shooting time of the first correction frame and is also referred to as the second shooting time. The one or more processors 11 can obtain movement change information of the UAV between the first shooting time and the second shooting time, according to the first correction frame and the keyframe. This movement change information can be used as the flight displacement vector. The flight displacement vector can include one or more of a rotational motion parameter, a translational motion parameter, or the like, of the UAV between the first shooting time and the second shooting time.

In some embodiments, the flight displacement vector can include direction information of a flight displacement of the UAV. The flight displacement refers to an amount of movement of the feature information of the second correction frame when compared with the feature information of the keyframe.

Furthermore, in order to control the UAV to perform spot hovering, the one or more processors 11 can control the current displacement of the UAV according to the flight displacement vector, such that the flight displacement vector can be less than or equal to a preset value. That is, the UAV is controlled to fly back to a position before the change of movement.

According to the embodiment of the disclosure, the one or more processors 11 can obtain the image frame after the keyframe as the first correction frame. That is, the flight displacement vector of the UAV can be corrected at any time, such that the spot hovering of the UAV can be realized.

In some embodiments, the one or more processors 11 can be configured to select stationary feature in the keyframe and correct the current displacement of the UAV based on the stationary feature. That is, the flight displacement vector of the UAV between the times corresponding to the first correction frame and the keyframe can be obtained, according to the stationary feature in the first correction frame and the keyframe.

In some embodiments, the one or more processors 11 can be configured to select a stationary feature point in the keyframe, and transform and project the selected feature point to the coordinate system of the first correction frame. Furthermore, the stationary feature point can be matched with the stationary feature in the first correction frame.

A displacement amount and a displacement direction of pixels of the feature points in the first correction frame can be obtained according to the matching result. The one or more processors 11 can obtain the flight displacement vector according to the displacement direction of pixels, the displacement amount of pixels, and a preset mapping relationship between the displacement amount of pixels and a flight distance, and correct the current displacement of the UAV based on the flight displacement vector.

In some embodiments, the one or more processors 11 can be also configured to obtain an image frame after the first correction frame as a second correction frame, and further correct the current displacement of the UAV according to the second correction frame and the keyframe.

In some embodiments, after obtaining the first correction frame, the one or more processors 11 can obtain the second correction frame to further correct the current displacement of the UAV.

In some embodiments, after obtaining the second correction frame, the one or more processors 11 can obtain an image after the second correction frame as a third correction frame, and further correct the current displacement of the UAV according to the third correction frame and the keyframe. That is, the one or more processors 11 can repeatedly perform the calibration processes to continuously modify the current displacement of the UAV, such that the spot hovering can be achieved.

In some embodiments, the one or more processors 11 can obtain the correction frame from the image sensor 12.

In some embodiments, the one or more processors 11 can also correct the current displacement of the UAV based on the first correction frame and the second correction frame. That is, the flight displacement vector can be obtained based on a subsequently acquired image frame and a previously acquired image frame, such that the current displacement of the UAV can be obtained. However, an error of the flight displacement vector obtained between the subsequently acquired image frame and the previously acquired image frame can be accumulated as the UAV hovers for a long time. As such, the UAV can drift relative to a preset spot, when the UAV performs the spot hovering.

For example, when there are a first error of the flight displacement vector obtained between the second correction frame and the first correction frame and a second error of the flight displacement vector obtained between the third correction frame and the second correction frame, a superposition of the first error and the second error can cause an inaccurate current displacement of the UAV after being corrected.

According to the embodiment of the disclosure, the one or more processors 11 can correct the current displacement of the UAV by using the keyframe as the reference object, such that the drift of the UAV caused by the superposition of the errors can be avoided.

In some embodiments, the one or more processors 11 can be also configured to obtain the flight velocity at a preset interval of time from the time of obtaining the keyframe, and when the flight velocity after the preset interval of time from the time of obtaining the keyframe satisfies the preset condition, update an image frame obtained after the preset interval of time from the time of obtaining the keyframe as the keyframe.

In some embodiments, the one or more processors 11 can obtain the flight velocity from another processor or from the velocity sensor 13.

The preset interval of time can be preset in the one or more processors 11 according to actual needs. For example, when the photographing component has a frame rate of 25 image frames per second, the one or more processors 11 can update the keyframe every 10 seconds. A frequency of updating the keyframe may be smaller than the frame rate of the photographing component.

According to the embodiment of the disclosure, the one or more processors 11 can update the keyframe after the preset interval of time and correct the current displacement of the UAV by using the updated keyframe as the reference object to compare with the correction frame, such that the influence of changes in illumination can be eliminated.

For example, assume that there is no positional displacement of the UAV with respect to the preset spot at the current time, but due to the change of the illumination, a difference between gray levels of the correction frame currently obtained by the one or more processors 11 and the keyframe can be significant. In this situation, when the flight displacement vector is obtained according to the current keyframe and the correction frame, a dislocation of the feature matching between the frames may be easily caused. As such, the obtained flight displacement vector may be inaccurate, which can further cause the problem that the hover control is not stable and accurate. However, when the one or more processors 11 can update the keyframe after the preset interval of time from the time of obtaining the keyframe, the difference between the gray levels of the images between the keyframe and the correction frame can be eliminated. That is, the influence of changes in illumination can be eliminated, such that the stability of the hover control can be improved.

In some embodiments, the one or more processors 11 can be also configured to obtain the image frame after the preset interval of time from the time of obtaining the keyframe, and when a similarity between the image frame after the preset interval of time and the keyframe satisfies a preset condition, the image frame after the preset interval of time is updated to be the keyframe.

When the similarity between the image frame after the preset interval of time from the time of obtaining the keyframe and the keyframe is high, the change of the illumination can be considered to be small at the current time, and the one or more processors 11 does not update the keyframe. In some embodiments, the keyframe can be updated even though the similarity is high.

In order to avoid the influence of the moving object on the similarity between the two image frames, the one or more processors 11 can select the stationary feature in the image frame after the preset interval of time, and determine the similarity between the image frame after the preset interval of time and the keyframe, according to the stationary feature.

When the similarity between the image frame after the preset interval of time and the keyframe is low, the change of the illumination can be considered to be large, and the keyframe can be updated.

In some embodiments, the one or more processors 11 can obtain the flight velocity after the preset interval of time from the time of obtaining the keyframe, when the flight velocity after the preset interval of time satisfies the preset condition, obtain the image frame after the preset interval of time from the time of obtaining the keyframe, and when the similarity between the image frame after the preset interval of time and the keyframe satisfies the preset condition, the image frame after the preset interval of time is updated to be the keyframe.

In some other embodiments, the image frame after the preset interval of time from the time of obtaining the keyframe can be obtained. When the similarity between the image frame after the preset interval of time and the keyframe satisfies a preset condition, the flight velocity after the preset interval of time can be obtained. When the flight velocity after the preset interval of time satisfies the preset condition, the image frame obtained after the preset interval of time can be updated to be the keyframe.

According to the embodiment of the disclosure, the one or more processors 11 can update the keyframe after the preset interval of time from the time of obtaining the keyframe, which can ensure that the difference of the gray levels between the keyframe and the correction frame can be eliminated. That is, the influence of changes in illumination can be eliminated, such that the stability of the hover control can be improved.

Figure 7:
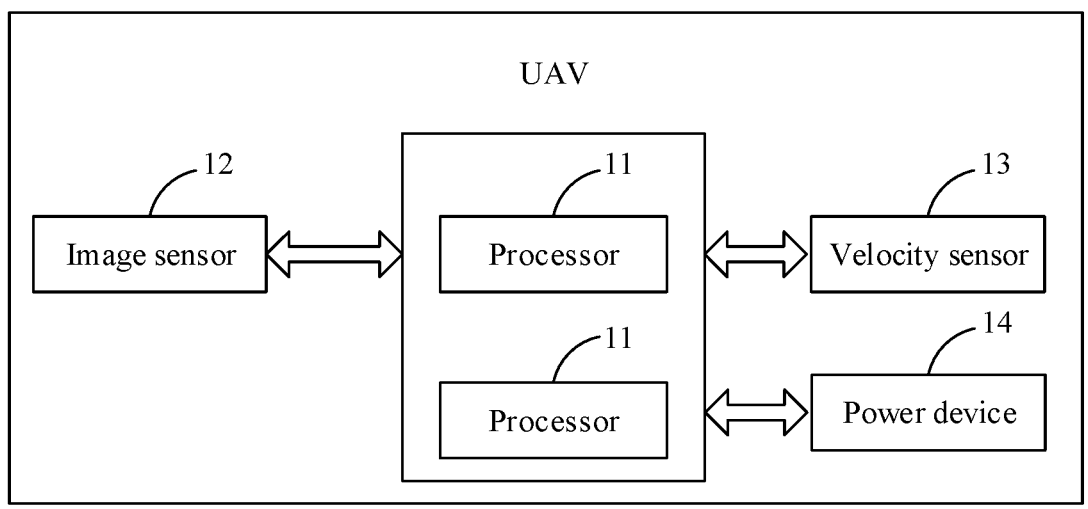
FIG. 7 is a schematic structural diagram of a UAV according to an embodiment of the disclosure.

FIG. 7 is a schematic structural diagram of an exemplary UAV consistent with the disclosure. As shown in FIG. 7, the UAV includes one or more processors 11 and a power device 14 communicatively coupled to the one or more processors 11. The power device 14 is configured to provide power for the UAV to fly, and the one or more processors 11 are configured to control the power device 14 to output the power to achieve a corresponding flight velocity.

The one or more processors 11 are also configured to, if the flight speed satisfies a preset condition, use an image frame obtained at a current moment as a keyframe and use the keyframe as a reference object to control hovering of the UAV.

The power device 14 can include one or more drive motors and an electronic governor.

In some embodiments, the one or more processors 11 can be coupled to the electronic governor of the power device 14 to obtain the flight velocity of the UAV.

In some embodiments, the one or more processors 11 can obtain the flight velocity of the UAV from another processor. In some other embodiments, the one or more processors 11 can obtain the flight velocity of the UAV from a velocity sensor carried by the UAV. In some embodiments, as shown in FIG. 7, the UAV includes the one or more processors 11 and the velocity sensor 13 communicatively coupled to the one or more processors 11. The velocity sensor 13 is configured to detect the flight velocity of the UAV.

In some embodiments, the velocity sensor 13 can be communicatively coupled to the power device 14 to obtain the flight velocity of the UAV from the power device 14.

In some embodiments, the velocity sensor 13 can include one or more of an Inertial Measurement Unit (IMU), an accelerometer, and a distance measurement sensor.

In some other embodiments, the one or more processors can obtain displacement information and time information of the UAV's flight from a Global Positioning System (GPS), so as to obtain the flight velocity of the UAV.

The keyframe refers to the image frame obtained when the flight velocity satisfies the preset condition.

In some embodiments, the preset condition can be that the UAV is relatively stationary and the value of the flight velocity of the UAV is very small. That is, if the value of the flight velocity is smaller than a preset threshold, the one or more processors 11 can obtain the image frame as the keyframe.

In some embodiments, the preset condition can be that the flight velocity is zero, and the one or more processors 11 can obtain the image frame at the current moment as the keyframe if this condition is satisfied.

In some other embodiments, the preset condition can also be that a velocity direction of the UAV oscillates in a preset direction. That is, if an integrated velocity of the UAV is less than a preset threshold, the one or more processors 11 can obtain the image frame at the current moment as the keyframe.

When the flight velocity satisfies the preset condition, the one or more processors 11 can use the keyframe as the reference object to compare with a prestored image frame. When feature information of the keyframe matches feature information of the prestored image frame, the one or more processors 11 can control the UAV to hover. When there is no relative displacement of pixels in a same coordinate system between the feature information of the keyframe and the feature information of the prestored image frame, the feature information of the keyframe and the feature information of the prestored image frame are determined to be matched.

The absence of the relative displacement of the pixels refers to that the feature information of the keyframe completely coincides with the feature information of the preset image frame in the same coordinate system. For example, the feature information of the prestored image frame can include a stationary object having a square structure with a size of 4×4 pixels or another size of another number of pixels. The one or more processors 11 can adjust flight velocity and flight direction of the UAV to control the stationary object having the square structure with the size of 4×4 pixels in the keyframe to completely coincide with that in a predicted image frame in the same coordinate system.

In some embodiments, the feature information can include a stationary feature object, such as a lighthouse, a building, or the like. In some embodiments, the feature information can also include a moving feature object, such as an airplane, a car, or the like. When the feature information includes the moving feature object, a movement velocity of the moving feature object can be obtained. The flight velocity of the UAV can be adjusted according to the movement velocity of the moving feature object and velocity information of the UAV. In some other embodiments, the feature information can include feature pixels. It is not intended to limit the selection of the feature information.

According to the embodiment of the disclosure, the one or more processors 11 can select the keyframe as the reference object to control the hovering of the UAV. A reverse compensate for a migration velocity of the UAV is not needed, thereby avoiding a drastic shake of the UAV.

In some embodiments, as shown in FIG. 7, the UAV also includes the image sensor 12 communicatively coupled to the one or more processors 11. The image sensor 12 is configured to capture image frames.

The image sensor 12 can include one or more cameras. The image sensor 12 can include one camera (i.e., a monocular camera) or two cameras (i.e., a binocular camera). It can be appreciated by those skilled in the art that the image sensor 12 can also include a plurality of cameras. It is not intended to limit the number of cameras.

It is not intended to limit a spectral band of the camera. For example, an infrared camera can be used to facilitate nighttime operations. As another example, a visible-light camera can also be used. The spectrum range of the camera can be changed according to actual needs.

In some embodiments, the one or more processors 11 can be configured to obtain an image frame after the keyframe as a first correction frame, and correct a current displacement of the UAV to control the hovering of the UAV, according to the first correction frame and the keyframe.

The current displacement refers to a displacement of the UAV between a shooting time of a currently acquired image frame and a shooting time of the keyframe.

In some embodiments, the one or more processors 11 can be configured to obtain a flight displacement vector of the UAV between times corresponding to the first correction frame and the keyframe, according to the first correction frame and the keyframe. This flight displacement vector can be used as the current displacement.

The time corresponding to the keyframe refers to the shooting time of the keyframe. The shooting time of the keyframe is referred to as the first shooting time. The time corresponding to the first correction frame refers to the shooting time of the first correction frame and is referred to as the second shooting time. The one or more processors 11 can obtain movement change information of the UAV between the first shooting time and the second shooting time, according to the first correction frame and the keyframe. This movement change information can be used as the flight displacement vector. The flight displacement vector can include one or more of a rotational motion parameter, a translational motion parameter, or the like, of the UAV between the first shooting time and the second shooting time.

In some embodiments, the flight displacement vector can include direction information of a flight displacement of the UAV. The flight displacement refers to an amount of movement of the feature information of the second correction frame when compared with the feature information of the keyframe.

Furthermore, in order to control the UAV to perform spot hovering, the one or more processors 11 can control the current displacement of the UAV according to the flight displacement vector, such that the flight displacement vector can be less than or equal to a preset value. That is, the UAV is controlled to fly back to a position before the change of movement.

According to the embodiment of the disclosure, the one or more processors 11 can obtain the image frame after the keyframe as the first correction frame. That is, the flight displacement vector of the UAV can be corrected at any time, such that the spot hovering of the UAV can be realized.

In some embodiments, the one or more processors 11 can be configured to select stationary feature in the keyframe and correct the current displacement of the UAV based on the stationary feature. That is, the flight displacement vector of the UAV between the times corresponding to the first correction frame and the keyframe can be obtained, according to the stationary feature object in the first correction frame and the keyframe.

In some embodiments, the one or more processors 11 can be configured to select a stationary feature point in the keyframe and, transform and project the selected feature point to the coordinate system of the first correction frame. Furthermore, the stationary feature point can be matched with the stationary feature in the first correction frame.

A displacement amount and a displacement direction of pixels of the feature point in the first correction frame can be obtained according to the matching result. The one or more processors 11 can obtain the flight displacement vector, according to the displacement direction of pixels, the displacement amount of pixels, and a preset mapping relationship between the displacement amount of pixels and a flight distance, and correct the current displacement of the UAV based on the flight displacement vector.

In some embodiments, the one or more processors 11 can be also configured to obtain an image frame after the first correction frame as a second correction frame, and further correct the current displacement of the UAV, according to the second correction frame and the keyframe In some embodiments, after obtaining the first correction frame, the one or more processors 11 can obtain the second correction frame to further correct the current displacement of the UAV.

In some embodiments, after obtaining the second correction frame, the one or more processors 11 can obtain an image after the second correction frame as a third correction frame, and further correct the current displacement of the UAV, according to the third correction frame and the keyframe. That is, the one or more processors 11 can repeatedly perform the calibration processes to continuously modify the current displacement of the UAV, such that the spot hovering can be achieved.

In some embodiments, the one or more processors 11 can obtain the correction frame from the image sensor 12.

In some embodiments, the one or more processors 11 can also correct the current displacement of the UAV based on the first correction frame and the second correction frame. That is, the flight displacement vector can be obtained based on a subsequently acquired image frame and a previously acquired image frame, such that the current displacement of the UAV can be obtained. However, an error of the flight displacement vector obtained between the subsequently acquired image frame and the previously acquired image frame can be accumulated as the UAV hovers for a long time. As such, the UAV can drift relative to a preset spot, when the UAV performs the spot hovering.

For example, when there are a first error of the flight displacement vector obtained between the second correction frame and the first correction frame and a second error of the flight displacement vector obtained between the third correction frame and the second correction frame, a superposition of the first error and the second error can cause an inaccurate current displacement of the UAV after being corrected.

According to the embodiment of the disclosure, the one or more processors 11 can correct the current displacement of the UAV by using the keyframe as the reference object, such that the drift of the UAV caused by the superposition of the errors can be avoided.

In some embodiments, the one or more processors 11 can be also configured to obtain the flight velocity at a preset interval of time from the time of obtaining the keyframe, and when the flight velocity after the preset interval of time satisfies the preset condition, an image frame obtained after the preset interval of time from the time of obtaining the keyframe is updated to be the keyframe.

In some embodiments, the one or more processors 11 can obtain the flight velocity from another processor or from the velocity sensor 13.

The preset interval of time can be preset in the one or more processors 11 according to actual needs. For example, when the photographing component has a frame rate of 25 image frames per second, the one or more processors 11 can update the keyframe every 10 seconds. A frequency of updating the keyframe is smaller than the frame rate of the photographing component.

According to the embodiment of the disclosure, the one or more processors 11 can update the keyframe after the preset interval of time from the time of obtaining the keyframe and correct the current displacement of the UAV by using the updated keyframe as the reference object to compare with the correction frame, such that the influence of changes in illumination can be eliminated.

For example, assume that there is no positional displacement of the UAV with respect to the preset spot at the current time, but due to the change of the illumination, a difference between gray levels of the correction frame currently obtained by the one or more processors 11 and the keyframe can be significant. In this situation, when the flight displacement vector is obtained according to the current keyframe and the correction frame, a dislocation of the feature matching between the frames may be easily caused. As such, the obtained flight displacement vector may be inaccurate, which may further cause the problem that the hover control is not stable and accurate. However, when the one or more processors 11 can update the keyframe after the preset interval of time, the difference between the gray levels of the images between the keyframe and the correction frame can be eliminated. That is, the influence of changes in illumination can be eliminated, such that the stability of the hover control can be improved.

In some embodiments, the one or more processors 11 can be also configured to obtain the image frame after the preset interval of time from the time of obtaining the keyframe, and when a similarity between the image frame after the preset interval of time and the keyframe satisfies a preset condition, the image frame after the preset interval of time is updated to be the keyframe.

When the similarity between the image frame after the preset interval of time and the keyframe is high, the change of the illumination can be considered to be small, and the one or more processors 11 cannot update the keyframe. In some embodiments, the keyframe can be updated even though the similarity is high.

In order to avoid the influence of the moving object on the similarity between the two image frames, the one or more processors 11 can select the stationary feature in the image frame after the preset interval of time, and determine the similarity between the image frame after the preset interval of time and the keyframe, according to the stationary feature.

When the similarity between the image frame after the preset interval of time and the keyframe is low, the change of the illumination can be considered to be large, and the keyframe can be updated.

In some embodiments, the one or more processors 11 can obtain the flight velocity after the preset interval of time from the time of obtaining the keyframe, when the flight velocity after the preset interval of time satisfies the preset condition, obtain the image frame after the preset interval of time, and when the similarity between the image frame after the preset interval of time and the keyframe satisfies the preset condition, update the image frame after the preset interval of time as the keyframe.

In some other embodiments, the image frame after the preset interval of time can be obtained. When the similarity between the image frame after the preset interval of time and the keyframe satisfies a preset condition, the flight velocity after the preset interval of time can be obtained. When the flight velocity after the preset interval of time satisfies the preset condition, the image frame obtained after the preset interval of time can be updated to be the keyframe.

According to the embodiment of the disclosure, the one or more processors 11 can update the keyframe after the preset interval of time the image frame after the preset interval of time can be obtained, which can ensure that the difference of the gray levels between the keyframe and the correction frame can be eliminated. That is, the influence of changes in illumination can be eliminated, such that the stability of the hover control can be improved.

The disclosed systems, apparatuses, and methods may be implemented in other manners not described here. For example, the devices described above are merely illustrative. For example, the division of units may only be a logical function division, and there may be other manners for dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physical unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a processor, a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A hover control method comprising:
   obtaining a flight velocity of an unmanned aerial vehicle (UAV);
   obtaining an image frame as a keyframe in response to that the flight velocity satisfies a preset condition; and
   controlling hovering of the UAV using the keyframe as a reference object.

2. The method of claim 1, wherein controlling the hovering of the UAV using the keyframe as the reference object includes:
   obtaining an image frame after the keyframe as a correction frame; and
   controlling the hovering of the UAV by correcting a displacement of the UAV according to the correction frame and the keyframe.

3. The method of claim 2, wherein correcting the displacement of the UAV includes:
   obtaining, according to the correction frame and the keyframe, a flight displacement vector of the UAV between a time corresponding to the correction frame and a time corresponding to the keyframe; and
   controlling the displacement of the UAV to be less than or equal to a preset value according to the flight displacement vector.

4. The method of claim 2, wherein correcting the displacement of the UAV includes:
   selecting a stationary feature from the keyframe; and
   determining the displacement of the UAV according to the stationary feature.

5. The method of claim 2,
   wherein the correction frame is a first correction frame; the method further comprising:
   obtaining an image frame after the first correction frame as a second correction frame; and
   correcting the displacement of the UAV according to the second correction frame and the keyframe.

6. The method of claim 1, wherein the preset condition includes the flight velocity being zero.

7. The method of claim 1,
   wherein the flight velocity is a first flight velocity, the preset condition is a first preset condition, and the image frame is a first image frame;
   the method further comprising:
   obtaining a second flight velocity after a preset interval of time from a time of obtaining the first image frame; and
   in response to the second flight velocity satisfying a second preset condition, obtaining a second image frame and updating the keyframe to be the second image frame.

8. The method of claim 1,
   wherein the image frame is a first image frame and the preset condition is a first preset condition;
   the method further comprising:
   obtaining a second image frame after a preset interval of time from a time of obtaining the first image frame; and
   in response to a similarity between the first image frame and the second image frame satisfying a second preset condition, updating the keyframe to be the second image frame.

9. The method of claim 8, further comprising:
   selecting a stationary feature from the second image frame; and
   determining the similarity according to the stationary feature.

10. A hover control system comprising:
    one or more processors configured to:
    obtain a flight velocity of an unmanned aerial vehicle (UAV);
    obtain an image frame as a keyframe in response to that the flight velocity satisfies a preset condition; and control hovering of the UAV using the keyframe as a reference object.

11. The system of claim 10, wherein the one or more processors are further configured to:
   obtain an image frame after the keyframe as a correction frame; and
   control the hovering of the UAV by correcting a displacement of the UAV according to the correction frame and the keyframe.

12. The system of claim 11, wherein the one or more processors are further configured to:
   obtain, according to the correction frame and the keyframe, a flight displacement vector of the UAV between a time corresponding to the correction frame and a time corresponding to the keyframe; and
   control the displacement of the UAV to be less than or equal to a preset value according to the flight displacement vector.

13. The system of claim 11 wherein the one or more processors are also configured to:
   select a stationary feature from the keyframe; and
   determine the displacement of the UAV according to the stationary feature.

14. The system of claim 11,
   wherein the correction frame is a first correction frame;
   the one or more processors are also configured to:
   obtain an image frame after the first correction frame as a second correction frame; and
   correct the displacement of the UAV according to the second correction frame and the keyframe.

15. The system of claim 10,
   wherein the flight velocity is a first flight velocity, the preset condition is a first preset condition, and the image frame is a first image frame;
   the one or more processors are also configured to:
   obtain a second flight velocity after a preset interval of time from a time of obtaining the first image frame; and
   in response to the second flight velocity satisfying a second preset condition, obtain a second image frame and updating the keyframe to be the second image frame.

16. The system of claim 10,
   wherein the image frame is a first image frame and the preset condition is a first preset condition;
   the one or more processors are also configured to:
   obtain a second image frame after a preset interval of time from a time of obtaining the first image frame; and
   in response to a similarity between the first image frame and the second image frame satisfying a second preset condition, update the keyframe to be the second image frame.

17. The system of claim 16, wherein the one or more processors are also configured to:
   select a stationary feature from the second image frame; and
   determine the similarity according to the stationary feature.

18. The system of claim 10, further comprising:
   an image sensor communicatively coupled to the one or more processors and configured to capture the image frame; and/or
   a velocity sensor communicatively coupled to the one or more processors and configured to detect the flight velocity of the UAV.

* * * * *